Aug. 22, 1967
W. L. WISTING
3,336,733
GAS SCRUBBER
Filed May 17, 1965
4 Sheets-Sheet 1
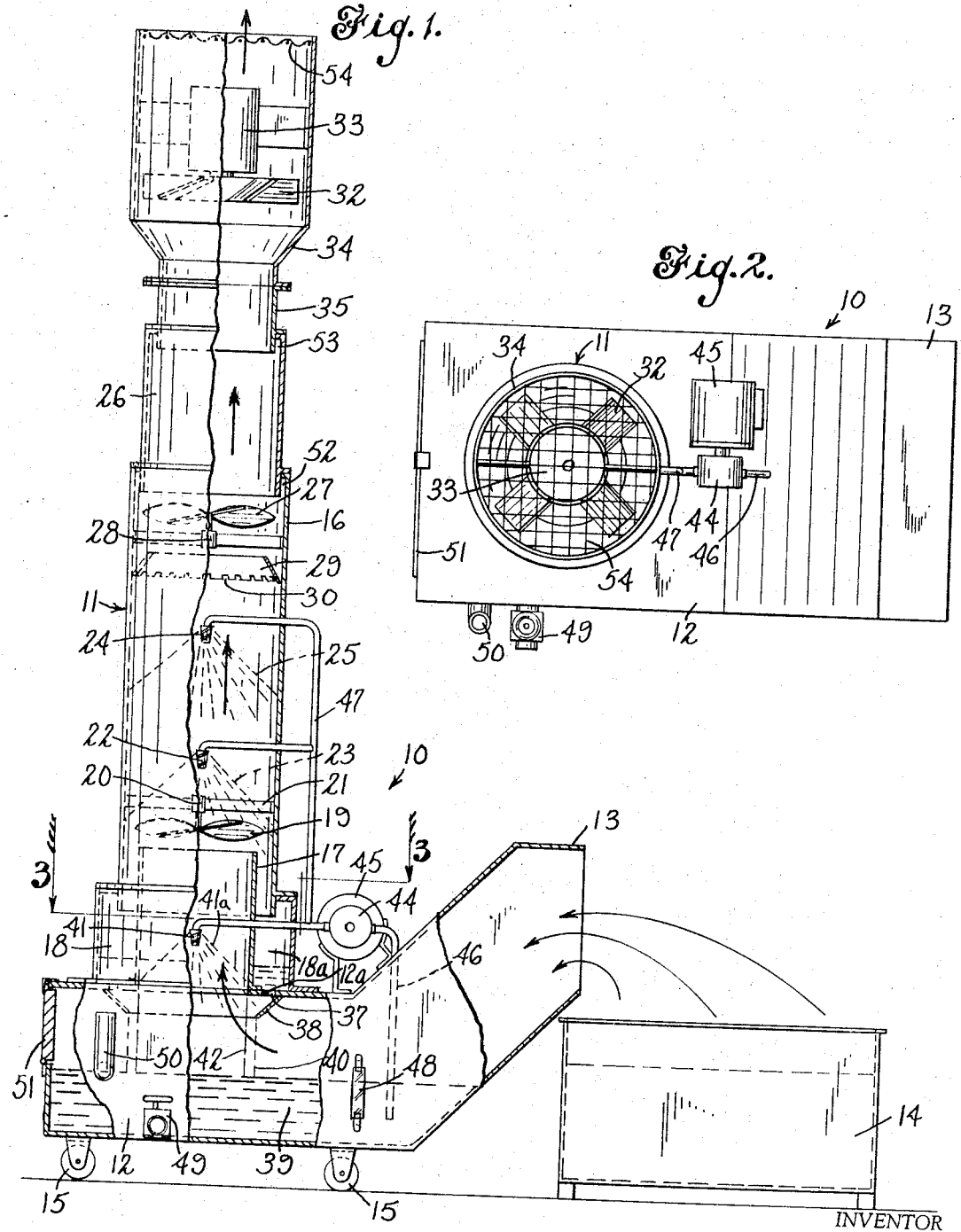
INVENTOR
Walter L. Wisting
BY DeLio and Montgomery
ATTORNEYS

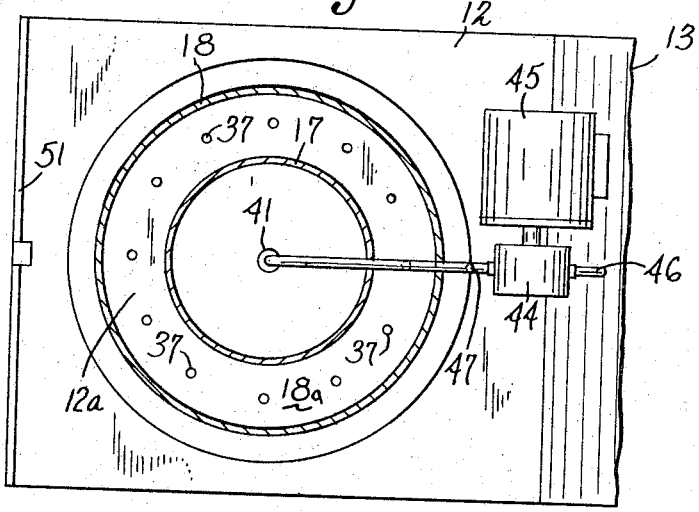
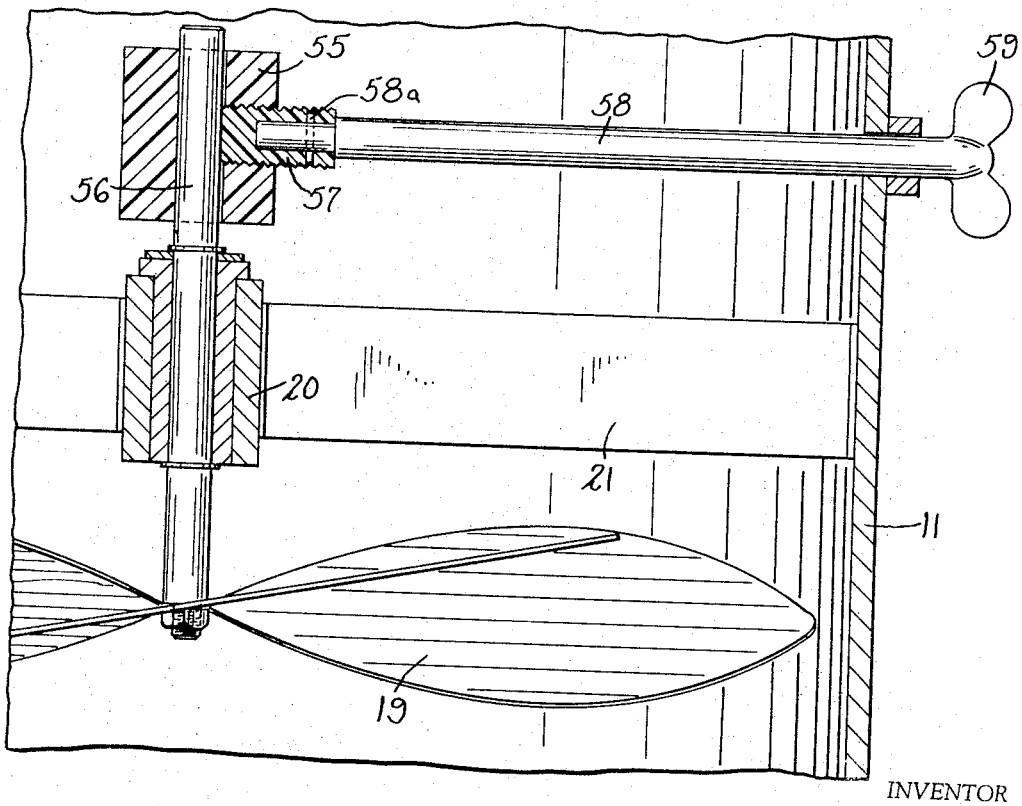

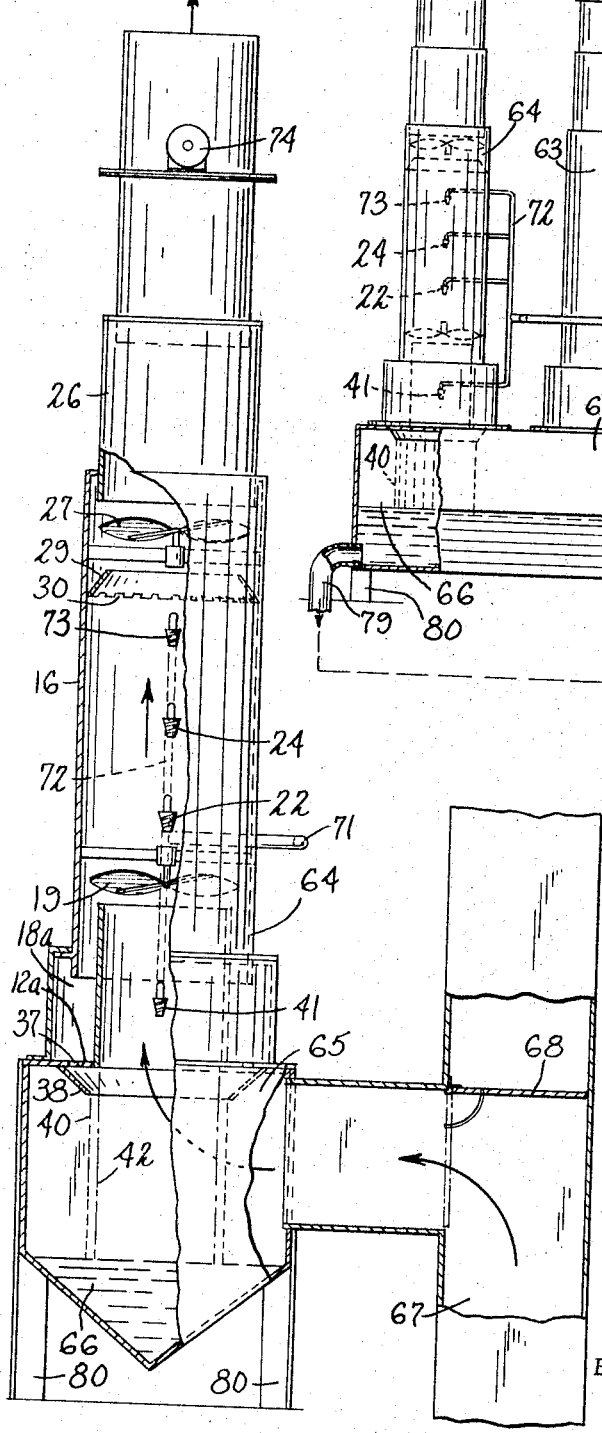
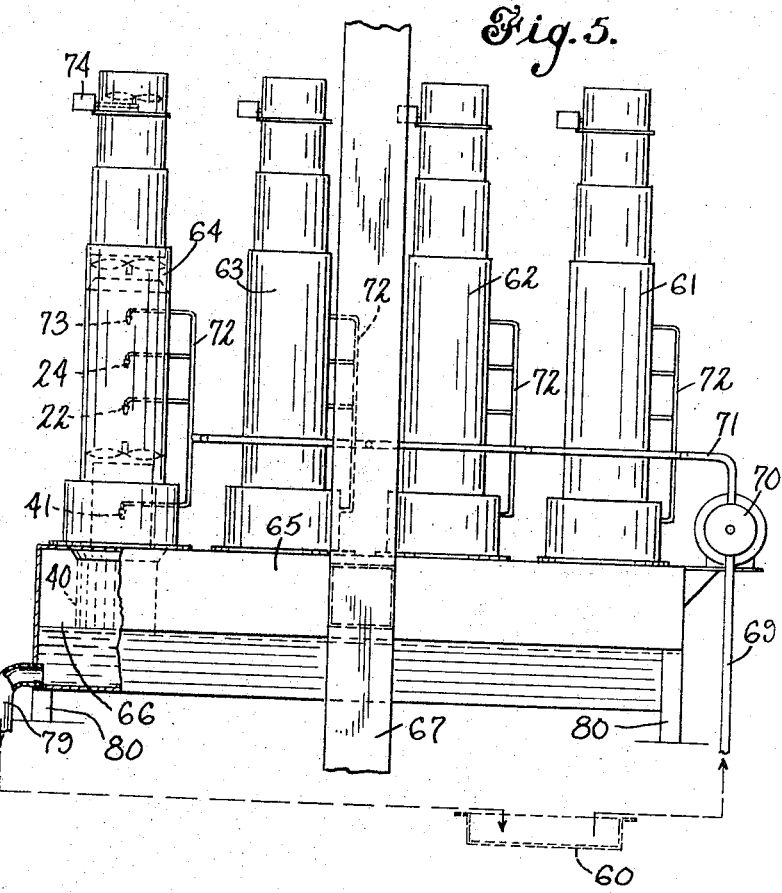

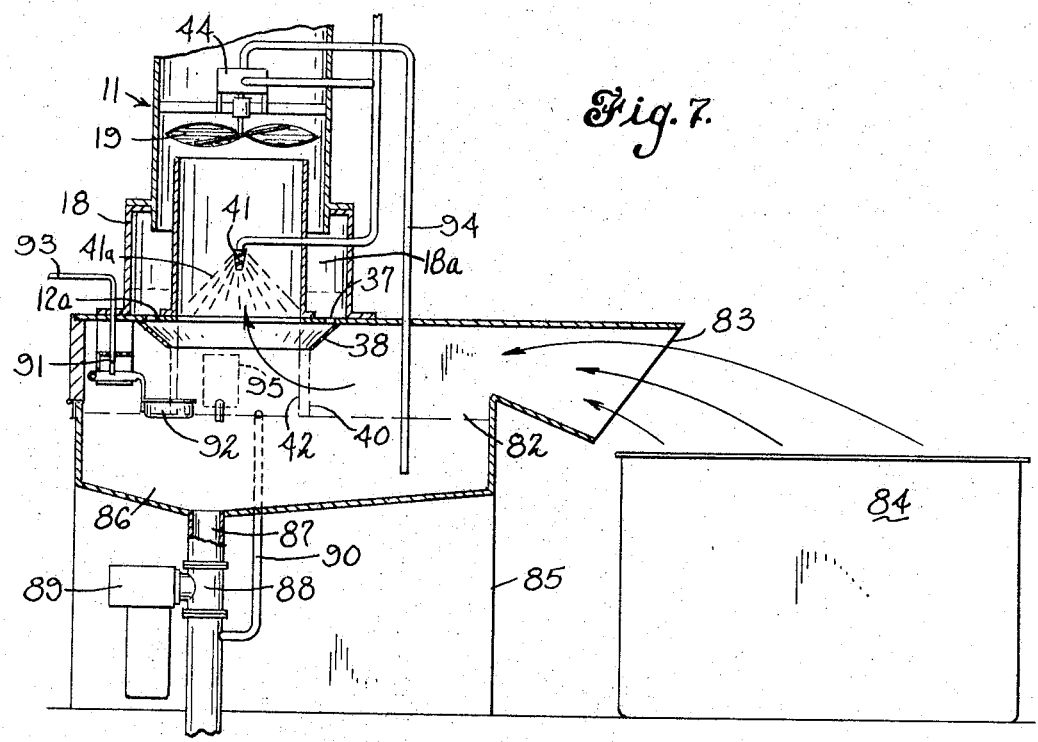

United States Patent Office 3,336,733
Patented Aug. 22, 1967

3,336,733
GAS SCRUBBER
Walter L. Wisting, Madison, Conn., assignor to Cen-Trific-Air Products, Inc., New Haven, Conn.
Filed May 17, 1965, Ser. No. 456,432
10 Claims. (Cl. 55—228)

This invention relates to air treating apparatus and more particularly relates to apparatus for acting upon air or a gas to remove contaminants therefrom and to exchange heat therewith.

Air washers, sometimes referred to as air scrubbers, or dust and fume collectors which wash air by passing air through sprays of water, are well known and most air washers utilize a liquid spray to remove or scrub contaminants from a moving air stream.

The present invention provides a new and improved air washer which also washes or scrubs air by passing the air to be washed or scrubbed through liquid spray zones. The present invention, however, provides a new and improved air washer which is constructed and arranged to more efficiently provide exposure of the air to the washing water and to increase the duration of such exposure and the uniformity thereof. Apparatus embodying the present invention is further so constructed and arranged as to maximize utilization of the washing water so that a given volume or quantity of water is utilized to create at least three different washing or scrubbing zones through which the air to be washed must pass. Apparatus embodying the invention is further so constructed and arranged that the water may be reused and the amount of water consumed by the device greatly minimized. The efficient utilization of the water and maximum exposure thereof to the air stream also produces an efficient liquid-gas heat exchanger which has many applications.

Accordingly, an object of this invention is to provide a new and improved air washing device.

Another object of this invention is to provide a new and improved air washer which is so constructed and arranged as to utilize a given quantity of water to perform multiple washing operations on an air stream.

Another object of this invention is to provide a new and improved air washer which is so constructed and arranged as to establish three washing zones, which utilize the same water, through which the air to be washed must pass.

Another object of this invention is to provide a new and improved air washer which consumes but little water.

A further object of this invention is to provide a new and improved liquid-gas heat exchanger.

The features of the invention which are believed to be novel are set forth with particularity and distinctly claimed in the concluding portion of this specification. The invention, however, both as to its operation and organization together with further objects and advantages thereof may best be appreciated by reference to the following detailed description taken in conjunction with the drawings, in which:

FIG. 1 is a side elevation, partly in half section, of a unit embodying the invention;

FIG. 2 is a plan view of the device of FIG. 1;

FIG. 3 is a sectional view seen in the plane of lines 3—3 of FIG. 1;

FIG. 4 is an enlarged sectional view of a portion of FIG. 1 illustrating a detail of construction not shown in FIG. 1;

FIG. 5 illustrates in elevation apparatus embodying the invention utilized as a gas-to-liquid heat exchanger;

FIG. 6 is a side elevational view partially in section of the apparatus of FIG. 5; and FIG. 7 is a side elevation, partly in half section, of another unit embodying the invention.

A unit embodying the invention is generally indicated by the reference numeral 10 and comprises a generally cylindrical casing portion 11 mounted on a hollow stand or housing member 12 formed with an intake conduit portion 13 adapted to be positioned adjacent a source of fumes, dust, powder, or other source of air contamination. As illustrated, the intake conduit portion 13 is positioned adjacent a vat 14 in which chemicals in powder form may be dumped for mixing. When such powders or small particles are dumped into vat 14 there is a resulting cloud of dust produced which would drift with and contaminate the air within the installation containing vat 14.

In the embodiment of the invention illustrated in FIG. 1 the unit 10 is mounted on wheels 15 and is adapted to be moved from vat to vat as the need arises.

Casing member 11 is of generally overall linear design and comprises a main cylindrical body portion 16 having an inlet conduit 17 of lesser diameter extending therein, and a further casing portion 18 at the bottom thereof and together with inlet conduit 17 forming an annular liquid sump 18a about inlet conduit 17. A bottom wall 12a shown as part of housing 12 cooperates with inlet conduit 17 and casing portion 18 to define an annular liquid sump around inlet conduit 17. A first fan 19 having radially extending blades has its shaft rotatably mounted in a hub 20 supported by bracket arms 21 extending from the interior of casing portion 16. Positioned above fan 19 is a spray nozzle 22 arranged to direct a spray of fine particles of water onto the blades of fan 19 as indicated by the dotted lines 23. A second spray nozzle 24 is disposed above spray nozzle 22 and arranged to emit a spray of fine particles of water as indicated by the dashed lines 25. Mounted adjacent the upper end of casing portion 16 and extending therein is a conduit 26. A second fan 27 having radially extending blades has its shaft rotatably mounted in a hub 28 supported on casing portion 16. Conduit 26 is of lesser diameter than body portion 16. A baffle of frusto-conical shape 29 is disposed within casing portion 16 and has apertures or notches 30 along the larger perimeter thereof for purposes hereinafter described. Air moving means in the form of a fan or blower 32 driven by a motor 33 is mounted in a housing 34 and carried on an outlet conduit 35. Outlet conduit 35 mounted to conduit 26 is preferably of the same diameter as inlet conduit 17. The apparatus thus far described is disclosed and claimed in the copending application of Walter L. Wisting, Ser. No. 418,379 filed Dec. 4, 1964 now abandoned and assigned to the same assignee as this application.

In accordance with the invention, casing 11 is provided with and mounted on hollow stand or housing member 12, and a ring of apertures 37 defined in bottom wall 12a provide communication between sump 18a and the interior of housing 12 to allow liquid from sump 18a to fall into housing 12 and produce a circular screen of water about the opening into conduit 17. Preferably a frusto-conical member 38 is suspended within housing 12 and extends beneath apertures 37 so that liquid striking the frusto-conical baffle will be more dispersed when it falls from the edge thereof into a liquid reservoir 39 defined by housing member 12. The opening through member 38 is of lesser dimension than the diameter of the ring of apertures 37. This produces a first circular screen of water indicated in broken line at 40 about the opening into inlet conduit 17. Additionally, a spray nozzle 41 is positioned within inlet conduit 17 and directed toward the inlet opening thereof. A portion of the liquid spray emanating from nozzle 41 strikes the interior wall of conduit 17 and falls downwardly into reservoir 39 to form a second circular screen of water about the opening into inlet conduit 17, indicated by the broken lines 42. A pump 44, driven by a motor 45, draws liquid from reservoir 39 through pipe 46 and supplies such liquid to manifold 47 and, hence, to spray nozzles 22, 24 and 41. Housing 12 is supplied with a liquid level sight tube 48, a drain valve and pipe 49 and a fill tube 50. Housing 12 also has a door 51 to allow access to the interior of housing 12 and removal of the contaminants scrubbed from the air stream.

In operation, both motors 33 and 45 are energized and fan 32 draws air into inlet 13. From there the air passes through the reservoir above the water level and through the two circular liquid screens 40 and 42. In passing through the liquid screens contaminants in the air are collected by the water and fall to the reservoir. Upon entering inlet conduit 17, the air flow impinges upon the blades of fan 19 causing fan 19 to rotate. Fan 19 is allowed to rotate at the speed at which it is driven by the air flow impinging thereon, except as otherwise described hereinafter. Spray nozzles 22 and 24, positioned above fan 19, spray drops of water thereon and the water impinging on fan 19 moves from blade to blade of the fan and, hence, to the inside walls of casing 11. This action is more specifically described in the aforementioned copending application. This produces a dynamically moving screen of water between the blades of fan 19 through which the air to be washed must pass, and thus assures efficient cleaning action. The blades of fan 19 are preferably wide, in partially overlapping relation, so as to define passages therebetween. When the water particles are thrown from the blades of fan 19 they run down the walls of casing 11 into sump 18a. Thereafter the water falls through apertures 37 onto dispersion baffle 38 and forms circular screen 40, previously described. It may thus be seen that the water emanating from nozzles 22 and 24 is used three times for air cleaning purposes. After traversing the dynamically moving screen of water set up by fan 19, the air passes through a spray zone produced by nozzles 22 and 24 where it is subject to further washing or scrubbing action.

The velocity of the air in casing 11 beyond inlet 17 is greater than the velocity of the air in inlet conduit 17 due to the greater diameter thereof and thus the air passing through is exposed to the spray 25 for a greater period of time. Additionally the air stream into the casing will pick up and entrain moisture particles from the screens 40 and 42, the moving screen between the blades of fan, and from sprays 23 and 25. The air then passes through baffle 29 of decreased diameter and its velocity is increased as it impinges upon the blades of fan 27. Fan 27 is driven solely by the air flow impinging thereon which drives it at very high speeds which may be in the neighborhood of 3,000 revolutions per minute, depending upon the cubic ft. per minute capacity of the blower. The blades of fan 27 are preferably formed similar to the blades of fan 19. The heavier moisture particles in the air, in striking the fan, are centrifugally thrown off to the walls of casing 11 while the washed air is passed on into outlet conduit 35.

Due to the high speed of rotation of fan 27, essentially all the liquid particles in the air stream impinge upon the blades thereof and are thrown off onto the sides of the casing 11. In some instances, the water particles thrown off the blades may tend to creep past fan 27. To combat this, conduit 26 is of lesser diameter and extends into casing 11 to define the annular pocket 52 to prevent the separated liquid from entering outlet conduit 26. Outlet conduit 35 may be similarly formed with respect to conduit 26 to provide the annular pocket 52 for the same purposes. Thereafter the clean, dry air exits from unit 10 through protective grill work 54 above blower 32. The diameters of the openings through inlet conduit 17, outlet conduit 35 and baffle 29 are the same.

It may be noted that the dust and fumes emanating through vat 14 are subjected to multiple washing actions. Dust laden air must pass through the two circular screens of water 40 and 42, through the spray of nozzle 41, through the dynamically moving water screen between the blades of fan 19 and through the spray of nozzles 22 and 24. It may further be seen that the spray from each of the three nozzles produces two or more air washing areas. Nozzle 41 produces the spray 41a and circular screen 42. Nozzle 22 produces the spray 23 and, together with fan 19 produces a dynamically moving water screen between the blades thereof. Further, the water eventually thrown from fan 19 runs down the walls of casing 11 into sump 18a to aid in producing the water screen 40. Spray nozzle 24 produces the spray area 25 and further adds to the water in sump 18a which produces the annular screen 40, and also contributes to the spray impinging on the blades of fan 19.

It is to be understood that the provision of nozzle 24 may be optional dependent upon the cleaning requirements of the unit 10. Also, more nozzles such as 24, may be added between nozzle 22 and baffle 29.

In the thus far disclosed embodiment of the invention, it is important that the dynamically moving screen of water be created between the blades of fan 19 for the most efficient cleaning action. Therefore, fan 19 should run at a speed at which the centrifugal force imparted to the water particles impinging thereon is not so great as to immediately throw the water particles from the blades of the fan. Therefore, where the fan 19 is freewheeling as disclosed, means may be provided for limiting the rotational speed thereof. Exemplary of such means is the arrangement shown in FIG. 4 which comprises a sleeve-like member 55 which may be carried on the shaft 56 of fan 19. Sleeve 55 is rendered non-rotatable by means of a member 57 threaded therein and carried by shaft 58 which extends through casing 11 and may be provided with a hand grip 59. Shaft 58 is keyed or pinned 58a to threaded member 57 and rotation of shaft 58 will move member 57 in sleeve 55 so as to have more or less contact pressure with shaft 56 and thereby place a controllable load thereon to limit the rotational speed of fan 19. Preferably the sleeve 55 and threaded member 57 are of tetrafluoroethylene, commonly known by the trademark "Teflon."

It will be apparent that other means may be provided for limiting the speed of fan 19. For example, a small friction brake could be mounted about a portion of shaft 56 with actuating means extending without the casing. In another embodiment of the invention hereinafter described the pump 44 is driven by fan 19 and thus places a suitable load thereon which limits the speed of rotation.

The invention has thus far been described as an air cleaner or washer which will efficiently remove contaminants, such as dust, dirt, fumes, etc. from the air passing therethrough. Additionally, grease may be efficiently removed by introducing a solvent into the water in reservoir 39. However, other embodiments of the invention may efficiently be utilized for heat exchange purposes to transfer heat from either liquid to gas, or vice versa.

FIGS. 5 and 6 illustrate an embodiment of the invention utilized as a heat exchanger to raise the temperature of water by extracting heat from exhaust gases. Such an application may be utilized where it is desired to keep the water or other liquid at a constant temperature. For example, it could be applied in a paper-making installation where a vat containing water and pulp is desired to be maintained at a substantially constant temperature. This may be the case where a Fourdrinier belt carrying a backing thereon is immersed in a pulp-containing solution in a vat 60 and the water therein must be maintained at a substantially constant temperature. In such an installation the water may be recirculated without loss of the pulp therein through a heat exchanger embodying the invention and hot gas, or the gas in an exhaust stack, which would otherwise be discharged to the atmosphere, be utilized to regulate the temperature of the water.

In FIG. 5 a plurality of units 61, 62, 63 and 64 are mounted on a housing or trough member 65. Units 61–64 are supported on the housing 65 which defines a longitudinally extending water reservoir 66. Hot gasses are applied to the interior of housing member 65 from an exhaust stack 67. Exhaust stack 67 contains a by-pass damper 68 which allows the exhaust gasses traveling therethrough to be either exhausted to the atmosphere or applied to the interior of housing 65. The water to be heated is drawn from vat 60 through a conduit 69 by a motor driven pump 70. The pressure side of pump 70 is connected to a manifold 71 which, in turn, connects to the manifold 72 of each of units 61–64. The units 61–64 are substantially identical in construction to unit 10 of FIG. 1 and the internal structure thereof will not be described in detail. Like elements of the structures of FIGS. 1–3 and FIGS. 5 and 6 bear like identifying reference numerals. However, it may be noted that each of units 61–64 includes additional spray nozzle 73 disposed above the first fan 19. Also, in the embodiments shown in FIGS. 5 and 6 the fans or blowers on each unit are driven by a motor 74 external thereto. This is merely a choice of design as to the drive for each unit blower.

In this embodiment of the invention, fan 19 is allowed to run free without restraint and will attain speeds of revolution which will cause water particles impinging thereon from nozzle 22 to be immediately broken up and thrown off the blade when the droplets strike, due to the high centrifugal force, in turn, due to the high speed of rotation. The water droplets will be centrifugally flung off the fan blades breaking into smaller drops and will further be picked up by the air stream moving through fan 19 and will generally follow a spiraling or helical path. Fan 19 is allowed to run at its driven speed with no restraint and the water particles striking the blades thereof are broken up into very fine particles due to the impact and the centrifugal force exerted thereon, and, therefore, a more dense and uniform spray or fog is created and is in a better heat exchange relationship with the air passing therethrough. The spray or fog thus created more efficiently absorbs the heat from the gas. The gas passing fan 19 thus must pass through the dynamically created spray or fog in addition to the spray from nozzles 22, 24 and 73, thus achieving a very efficient heat exchange relationship with the water drawn from vat 60 by pump 70.

In the manner previously explained, the water thrown off the blades of fan 19, and striking the walls of the casing, drain down to sump 18a. Moisture laden air traveling through the casing impinges upon eliminator fan 27 which is free running at a very high speed. The moisture particles impinging thereon are centrifugally thrown off onto the walls of the casing and drain back to the sump. From the sump the water runs through apertures 37 onto dispersion cone 38 to create the circular screens of water indicated by the broken lines 40. Nozzle 41 further creates the screen 42. Housing member 65 is provided with a drain 79 to allow the heated water to run back to vat 60. The overall unit may be constructed with a number of units 61–64 as desired to effect a predetermined amount of exchange of heat from the air to the water as may be determined by the requirements of the application. Additionally, the number of units used will depend upon the capacity of each unit in relation to the total requirements.

In operation, the water to be heated is drawn by pump 70 from source, vat 60, and applied through manifold 71 to the spray nozzles of each of the units 61–64. The spray and fog is set up within the casing 11 as previously described and water drains to sump 18a and falls from there into reservoir 66 creating the circular screens 40 and 42. The exhaust gasses entering housing or trough 65 and exhaust stack 67 through coupling member 78 are drawn through the individual units 61–64 by the blowers mounted thereon.

It will be apparent that the water to be heated is given maximum exposure to the exhaust gasses and an efficient exchange of heat therebetween occurs. If it is desired to shut down the heat exchange unit, or heating of the water in vat 60 is no longer desired the unit may shut down merely by turning off the motor driving pump 70 and the blower motors and changing the position of damper 68 to that shown in dotted line and the exhaust gasses will be discharged to the atmosphere. The whole unit may be mounted as on legs 80 and positioned wherever convenient to receive the gasses through stack 67. If located within a building it may be desired to duct from the floors of each of units 61–64 to the exterior. The unit preferably will be mounted on the roof of a building.

Another embodiment of the invention similar to that described in conjunction with FIGS. 1 and 2 is disclosed in FIG. 7 in a stationary installation. In FIG. 7 the unit 11 is mounted on a housing or reservoir defining member 82 having an inlet opening 83 defined therein to receive fumes or dust, etc. from a vat indicated by the reference numeral 84. Housing 82 is mounted on a base or pedestal member 85. The bottom of housing member 82 is preferably depressed towards a central portion thereof as indicated by the reference numeral 86 so that any sediment collected in the bottom of housing 82 settles towards drain pipe 87. Drain pipe 87 has a valve 88 therein controlled by a timing motor 89 which may be set to open valve 88 for a given period of time at predetermined intervals, and allow any sediment or contamination collected on the bottom tank 86 to be drained away. An overflow pipe 90 is positioned in the reservoir to drain off water above a predetermined level and by-passes drain valve 88 to drain pipe 87. Fresh water may be admitted to the reservoir through a valve 91 controlled by a float 92, thus as the water overflows through pipe 90 or is dumped through drain valve 88 at predetermined intervals, fresh water is admitted through line 93 from a source, not shown, which may be a central water supply. In this manner, the water in the reservoir is changed and freshened at a predetermined rate. This provides a substantial savings in water. With this arrangement the water may be freshened as the contaminants therein build up by drawing off floating contaminants through overflow pipe 87 and admitting fresh water as the level falls. Such fall in water level is sensed by float 92. Additionally, sediment or contamination which settles in the bottom of the reservoir may be periodically dumped through drain valve 88. The setting of the float controlled valve and the timing of the drain valve may be selected in accordance with the known degree of build-up of contamination in the reservoir. Float controlled valves are well known to those skilled in the art and need not be specifically described here. A suitable float control valve is disclosed in the aforementioned co-pending application.

In the apparatus shown in FIG. 7, the pump 44 is driven by fan 19 and draws water from the reservoir through pipe 94 and supplies water to nozzle 41 and nozzles 22 and 24 (not shown in FIG. 7). The pump comprises a suitable means for limiting the rotational speed of the fan.

In applications where the air to be cleaned includes grease, a grease solvent may be introduced into the reservoir by means of a solvent injector 95 mounted on the housing 82 to inject a grease solvent into the reservoir. Such solvent injectors with a regulatable feed rate are well known in the art and available from Mec-O-Matic, Inc., Miami, Fla. This company's model H20J1 has proved satisfactory.

For most efficient operation, the first or scrubber fan 19 preferably has wide overlapping blades which are pitched between 18 to 25 degrees. This allows the fan to be driven without building up undesired air resistance as would be the case if the pitch were smaller. Also, the blades then define a passage therebetween for air which imparts to the air a spiraling or helical motion as it moves through the spray zone created by the nozzle(s) to produce a more efficient washing action. If the pitch of the blades is substantially increased the air will tend to move more linearly through the casing and will not have as great an exposure to the spray of the nozzle(s) as if it had a generally helical motion therethrough.

Additionally, the velocity of air flow through the casing is selected in accordance with the volumetric rate (cubic feet/minute) and the size of the unit so that the air flow impinging on the second or eliminator fan drives this fan aat a sufficient speed of rotation to achieve very efficient elimination of water particles from the air. The selection of the size of the opening in the baffle before the eliminator fan also determines the velocity of the air impinging on the second fan and, hence, the rotational speed thereof.

It may thus be seen that the objects of the invention as set forth as well as those made apparent in the preceding description are efficiently attained. While various embodiments of the invention have been set forth for purposes of disclosure, other embodiments of the invention as well as modifications to the disclosed embodiments may occur to those skilled in the art. Accordingly, the appended claims are intended to cover all embodiments of the invention as well as modifications to the disclosed embodiments of the invention which do not depart from the spirit and scope of the invention.

The embodiments of the invention in which an exclusive property or privilege is claimed are defined as follows:

1. Gas treating apparatus comprising an elongated hollow generally cylindrical casing, said casing being vertically disposed and having an outlet opening at the upper end thereof and an inlet opening at the lower end thereof, said inlet opening being defined by an inlet conduit extending axially into said casing at the lower end thereof, said inlet conduit being of lesser transverse dimension than said casing and spaced from the walls of said casing, a hollow housing, said casing being mounted on said hollow housing and extending upwardly therefrom, said inlet conduit being constructed and arranged to provide open communication between said casing and the interior of said housing, a bottom wall joining said inlet conduit and said casing and together with said inlet conduit and said casing defining an annular liquid sump around said inlet conduit in open communication with the interior of said casing, means in said casing for creating a screen of liquid particles extending transversely across the opening of said inlet conduit in said casing so that the liquid particles are directed onto the walls of said casing and fall into said sump, means for supplying liquid to said means for creating a plurality of apertures defined in said bottom wall, said apertures being in a substantially circular arrangement so that liquid collected in said sump falls through said apertures into said housing in an annular screen around the opening of said inlet conduit, and a gas inlet opening defined in said housing so that gas may flow into said housing through the annular screen of water into said inlet conduit and said casing to said outlet opening.

2. The apparatus of claim 1 wherein said means for creating comprises a fan having radially extending blades rotatably mounted in said casing immediately adjacent the end of said inlet conduit extending into said casing, the blades of said fan spanning a greater dimension than the dimension across said inlet conduit, said fan arranged to be rotated solely by gas flow into said conduit impinging on the blades thereof, and means positioned substantially coaxially with the axis of rotation of said fan for spraying water onto the blades of said fan as it is rotated so as to create said screen of water between the blades thereof.

3. The apparatus of claim 2 further including means for limiting the speed of rotation of said fan.

4. The apparatus of claim 1 wherein the means for supplying liquid draws liquid from said housing to said means for creating, and means for injecting a chemical reactant into the liquid in said housing.

5. The apparatus of claim 2 further including a pump driven by said fan, said pump being arranged to draw liquid from said housing and supply such drawn liquid under pressure to said means for spraying.

6. The apparatus of claim 1 further including means for changing the liquid in said housing at a predetermined rate.

7. The apparatus of claim 1 further including a member of frusto-conical shape converging downwardly in said housing positioned below said apertures in said bottom wall and having a lower central opening therethrough of lesser diameter than the dimension between said apertures measured diametrically across said annular sump.

8. The apparatus of claim 1 wherein said outlet opening is defined by a conduit extending axially into said casing through the end thereof opposite said inlet conduit, said outlet conduit having a lesser dimension than the dimension across said casing, a fan having radially extending blades rotatably mounted in said casing immediately before said outlet conduit and adapted to be driven solely by air flow through said casing, the blades of said second fan spanning a dimension greater than the largest dimension across said outlet opening.

9. Gas treating apparatus comprising a hollow housing member defining a liquid reservoir and having a gas inlet opening, an elongated hollow casing extending vertically from said housing and having an upper outlet opening and a lower inlet opening, said inlet opening being defined by a cylindrical conduit extending substantially coaxially into said casing and having a lesser transverse dimension than said casing, said inlet conduit being constructed and arranged to provide open communication between the interior of said housing and said casing, a bottom wall joining said inlet conduit and said casing to define an annular liquid sump around said inlet conduit, said bottom wall having a plurality of apertures defined therein providing communication with the interior of said housing to permit liquid in said sump to fall into said housing, said apertures being in a substantially circular arrangement so that liquid collected in said sump falls through said apertures into said housing in an annular screen around the opening of said inlet conduit, means in said casing for creating a screen of liquid particles extending transversely across the opening of said inlet conduit in said casing so that liquid particles are directed onto the walls of said casing and fall into said sump, means for supplying liquid to said means for creating a fan having radially extending blades rotatably mounted before said outlet opening and arranged to be driven solely by gas flow impinging thereon, said fan being effective to centrifugally throw liquid particles onto the walls of said casing whereby the liquid particles drain to said sump, and means for moving gas through said apparatus.

10. Gas treating apparatus comprising a hollow housing, a plurality of gas treating devices, each of said devices comprising an elongated hollow generally cylindrical casing extending vertically from said housing and having an inlet conduit extending vertically therein, said inlet conduit being of lesser transverse dimension than said casing, said inlet conduit being constructed and arranged to provide open communication between said casing and said housing to permit passage of gas from said housing to said casing, a bottom wall joining said casing and said inlet conduit to define an annular liquid sump about said inlet conduit and in open communication with said casing, a plurality of apertures defined in said bottom wall in a substantially circular arrangement and providing communication between said sump and the interior of said housing so that liquid falls from said sump into said housing in an annular screen around the opening of said inlet conduit, means in said casing immediately adjacent said inlet conduit for creating a moving screen of liquid transverse to the length thereof directed onto the walls of said casing, whereby the liquid upon striking the walls of said casing falls into said sump, means for supplying liquid to said means for creating an outlet opening defined at the upper end of said casing; a gas intake opening defined in said hollow housing, and means for moving gas into said housing through the intake opening defined therein, through the annular screens of liquid into said casings through said inlet conduits and said moving screens of liquid and through said outlet openings in said casings.

References Cited

UNITED STATES PATENTS

| | | | |
|---|---|---|---|
| 797,661 | 8/1905 | Cline | 261—89 |
| 1,109,171 | 9/1914 | Lundeberg | 55—230 |
| 1,575,242 | 3/1926 | Willoughby | 253—37 |
| 1,673,732 | 6/1928 | Brooks | 55—227 |
| 2,217,130 | 10/1940 | Niehart | 55—288 |
| 2,326,360 | 8/1943 | Ingersoll | 55—467 |
| 3,020,974 | 2/1962 | Hungate | 55—230 |
| 3,048,875 | 8/1962 | Bottinelli et al. | 261—24 |
| 3,100,809 | 8/1963 | Baker | 261—117 |
| 3,138,441 | 6/1964 | Krantz | 55—240 |
| 3,192,689 | 7/1965 | Smith | 55—229 |
| 3,194,544 | 7/1965 | Jamison et al. | 55—230 |
| 3,206,177 | 9/1965 | Caplow | 261—89 |

FOREIGN PATENTS

| | | |
|---|---|---|
| 1,493 | 6/1900 | Austria. |
| 16,822 | 1896 | Great Britain. |

HARRY B. THORNTON, *Primary Examiner.*

B. NOZICK, *Assistant Examiner.*